(12) United States Patent  
Hilgendorff

(10) Patent No.: US 9,540,980 B2
(45) Date of Patent: Jan. 10, 2017

(54) NOX STORAGE MATERIALS AND TRAPS RESISTANT TO THERMAL AGING

(75) Inventor: Marcus Hilgendorff, Hannover (DE)

(73) Assignee: BASF SE, Ludwigshafen (DE)

( * ) Notice: Subject to any disclaimer, the term of this patent is extended or adjusted under 35 U.S.C. 154(b) by 1163 days.

(21) Appl. No.: 13/055,822

(22) PCT Filed: Jul. 27, 2009

(86) PCT No.: PCT/EP2009/059645
§ 371 (c)(1),
(2), (4) Date: Jan. 25, 2011

(87) PCT Pub. No.: WO2010/012677
PCT Pub. Date: Feb. 4, 2010

(65) Prior Publication Data
US 2011/0126527 A1    Jun. 2, 2011

(30) Foreign Application Priority Data

Jul. 31, 2008 (EP) .................... 08161545

(51) Int. Cl.
*B01D 53/94* (2006.01)
*B01J 27/232* (2006.01)
(Continued)

(52) U.S. Cl.
CPC ......... *F01N 3/0814* (2013.01); *B01D 53/9422* (2013.01); *B01J 23/58* (2013.01); *B01J 23/63* (2013.01); *B01J 35/006* (2013.01); *B01J 35/023* (2013.01); *B01J 35/04* (2013.01); *B01J 35/1014* (2013.01); *B01J 35/1019* (2013.01); *B01J 37/0219* (2013.01); *B01J 37/0244* (2013.01); *B01J 37/0248* (2013.01); *B01D 2255/1021* (2013.01); *B01D 2255/1023* (2013.01); *B01D 2255/1025* (2013.01); *B01D 2255/1028* (2013.01); *B01D 2255/202* (2013.01); *B01D 2255/2042* (2013.01); *B01D 2255/2063* (2013.01); *B01D 2255/2065* (2013.01);
(Continued)

(58) Field of Classification Search
None
See application file for complete search history.

(56) References Cited

U.S. PATENT DOCUMENTS 5,248,650 A   9/1993  Sekiba et al.
5,597,771 A   1/1997  Hu et al.
(Continued)

FOREIGN PATENT DOCUMENTS

KR   10-2004-0047966   6/2004
KR   10-2006-0107757   10/2015
(Continued)

OTHER PUBLICATIONS

WIPO Written Opinion for PCT/EP2009/059645.*
International Search Report issued Oct. 14, 2009 in PCT/EP09/059645 filed Jul. 27, 2009.

*Primary Examiner* — Colin W Slifka
(74) *Attorney, Agent, or Firm* — Oblon, McClelland, Maier & Neustadt, L.L.P.

(57) ABSTRACT

Nitrogen oxide storage catalysts comprising a substrate and at least two coating layers, where the second layer is substantially free of platinum, cerium and barium, and methods of manufacturing and using these nitrogen oxide storage catalysts are disclosed.

19 Claims, 5 Drawing Sheets

(51) Int. Cl.

| | | |
|---|---|---|
| *B01J 27/02* | (2006.01) | |
| *B01J 27/04* | (2006.01) | |
| *F01N 3/10* | (2006.01) | |
| *F01N 3/08* | (2006.01) | |
| *B01J 23/58* | (2006.01) | |
| *B01J 23/63* | (2006.01) | |
| *B01J 35/00* | (2006.01) | |
| *B01J 35/02* | (2006.01) | |
| *B01J 35/04* | (2006.01) | |
| *B01J 35/10* | (2006.01) | |
| *B01J 37/02* | (2006.01) | |
| *B01J 37/00* | (2006.01) | |
| *B01J 37/08* | (2006.01) | |

(52) U.S. Cl.
CPC .......... *B01D 2255/2092* (2013.01); *B01D 2255/20715* (2013.01); *B01D 2255/9022* (2013.01); *B01D 2255/91* (2013.01); *B01D 2255/9207* (2013.01); *B01J 37/0036* (2013.01); *B01J 37/08* (2013.01)

(56) References Cited

U.S. PATENT DOCUMENTS

| | | |
|---|---|---|
| 6,141,960 A * | 11/2000 | Takami et al. ............... 60/286 |
| 2001/0022956 A1* | 9/2001 | Okamoto et al. .......... 423/213.5 |
| 2005/0129601 A1 | 6/2005 | Li et al. |
| 2007/0269353 A1 | 11/2007 | Li et al. |
| 2008/0120970 A1 | 5/2008 | Hilgendorff et al. |

FOREIGN PATENT DOCUMENTS

| | | |
|---|---|---|
| WO | 95 00235 | 1/1995 |
| WO | 2005 047663 | 5/2005 |
| WO | 2008 067375 | 6/2008 |

* cited by examiner

NOX STORAGE MATERIALS AND TRAPS RESISTANT TO THERMAL AGING

TECHNICAL FIELD

Embodiments of the invention relate to nitrogen oxide storage materials and methods for their manufacture. More particularly, embodiments of the invention pertain to $NO_x$ storage materials that are resistant to thermal aging and methods of making such materials. The nitrogen oxide storage materials may be part of a catalytic trap used to treat exhaust gas streams, especially those emanating from lean-burn gasoline or diesel engines.

BACKGROUND

Emission of nitrogen oxides ("$NO_x$") from lean-burn engines (described below) must be reduced in order to meet emission regulation standards. Conventional three-way conversion ("TWC") automotive catalysts are suitable for abating $NO_x$, carbon monoxide ("CO") and hydrocarbon ("HC") pollutants in the exhaust of engines operated at or near stoichiometric air/fuel conditions. The precise proportion of air to fuel which results in stoichiometric conditions varies with the relative proportions of carbon and hydrogen in the fuel. An air-to-fuel ("A/F") ratio of 14.65:1 (weight of air to weight of fuel) is the stoichiometric ratio corresponding to the combustion of a hydrocarbon fuel, such as gasoline, with an average formula $CH_{1.88}$. The symbol $\lambda$ is thus used to represent the result of dividing a particular A/F ratio by the stoichiometric A/F ratio for a given fuel, so that; $\lambda=1$ is a stoichiometric mixture, $\lambda>1$ is a fuel-lean mixture and $\lambda<1$ is a fuel-rich mixture.

Engines, especially gasoline-fueled engines to be used for passenger automobiles and the like, are being designed to operate under lean conditions as a fuel economy measure. Such engines are referred to as "lean-burn engines". That is, the ratio of air to fuel in the combustion mixtures supplied to such engines is maintained considerably above the stoichiometric ratio (e.g., at an air-to-fuel weight ratio of 18:1) so that the resulting exhaust gases are "lean", i.e., the exhaust gases are relatively high in oxygen content.

Although lean-burn engines provide enhanced fuel economy, they have the disadvantage that conventional TWC catalysts are not effective for reducing $NO_x$ emissions from such engines because of excessive oxygen in the exhaust. Attempts to overcome this problem have included operating lean-burn engines with brief periods of fuel-rich operation (engines which operate in this fashion are sometimes referred to as "partial lean-burn engines"). The exhaust of such engines is treated with a catalyst/$NO_x$ sorbent which stores $NO_x$ during periods of lean (oxygen-rich) operation, and releases the stored $NO_x$ during the rich (fuel-rich) periods of operation. During periods of rich (or stoichiometric) operation, the catalyst component of the catalyst/$NO_x$ sorbent promotes the reduction of $NO_x$ to nitrogen by reaction of $NO_x$ (including $NO_x$ released from the $NO_x$ sorbent) with HC, CO and/or hydrogen present in the exhaust.

Diesel engines provide better fuel economy than gasoline engines and normally operate 100% of the time under lean conditions, where the reduction of $NO_x$ is difficult due to the presence of excess oxygen. In this case, the catalyst/$NO_x$ sorbent is effective for storing $NO_x$. As in the case of the gasoline partial lean burn application, after the $NO_x$ storage mode, a transient rich condition must be utilized to release/reduce the stored $NO_x$ to nitrogen. In the case of the diesel engine, this transient reducing condition will require unique engine calibration or injection of a diesel fuel into the exhaust to create the next reducing environment.

$NO_x$ storage (sorbent) components including alkaline earth metal compounds, for example oxides, such as oxides of Mg, Ca, Sr and Ba, alkali metal oxides such as oxides of Li, Na, K, Rb and Cs, and rare earth metal compounds, for example, oxides such as oxides of Ce, La, Pr and Nd in combination with precious metal catalysts such as platinum dispersed on an alumina support have been used in the purification of exhaust gas from an internal combustion engine. It is known that in air, these materials are mostly present in the form of carbonates and hydroxides, and these compounds are suitable for storing NOx. At high temperatures, the metal carbonates and hydroxides form metal oxides. Thus, as used in this specification, NOx storage "oxides" are intended to include the corresponding carbonates and hydroxides. For $NO_x$ storage, barium oxide (baria) is usually preferred because it forms nitrates at lean engine operation and releases the nitrates relatively easily under rich conditions. However, catalysts that use baria for $NO_x$ storage exhibit a problem in practical application, particularly when the catalysts are aged by exposure to high temperatures and lean operating conditions. After such exposure, such catalysts show a marked decrease in catalytic activity for $NO_x$ reduction, particularly at low temperature (200 to 350° C.) and high temperature (450° C. to 600° C.) operating conditions. In addition, $NO_x$ absorbents that include baria suffer from the disadvantage that when exposed to temperatures above 450° C. in the presence of $CO_2$, barium carbonate forms, which becomes more stable than barium nitrate. Furthermore, barium tends to sinter and to form composite compounds with support materials, which leads to the loss of $NO_x$ storage capacity.

$NO_x$ storage materials comprising barium fixed to ceria particles have been reported, and these $NO_x$ materials have exhibited improved thermal aging properties compared to the catalyst materials described above. Despite these improvements, there is an ongoing need to improve the performance of $NO_x$ storage materials, particularly the ability of these materials to operate over a wide temperature range and to operate effectively after exposure to high temperature. It is also desirable to improve the kinetics of $NO_x$ oxidation (required in advance of $NO_x$ storage) and the kinetics of $NO_x$ reduction (required following $NO_x$ release). Thus, there is a need to provide improved $NO_x$ storage materials and methods for their manufacture.

SUMMARY

Aspects of the invention include nitrogen oxide storage materials, catalysts in the form catalytic traps for the abatement of nitrogen oxide, methods for manufacturing both the nitrogen oxide storage materials and the catalytic traps for the abatement of nitrogen oxides, and methods of abating nitrogen oxide in an exhaust gas stream.

One or more embodiments of the invention are directed to a nitrogen oxide storage catalyst comprising a substrate and at least two layers, in particular washcoat layers. According to one or more embodiments, a second washcoat layer containing rhodium or palladium does not contain platinum, cerium or barium to prevent detrimental interactions of rhodium or palladium with platinum, cerium or barium. In one embodiment, the first washcoat layer comprises a nitrogen oxide storage material comprising metal oxide support particles having a metal compound selected from an alkaline earth metal compound, an alkali metal compound and a rare earth metal compound supported on the metal oxide support particles. The alkaline earth metal compound, the alkali metal compound and the rare earth metal compound may be present in the form of oxides, hydroxide or carbonates. The second washcoat layer comprises a single precious metal. The second washcoat layer may be substantially free of platinum, cerium and barium.

The second washcoat layer of other embodiments comprises rhodium or palladium and is substantially free of platinum. In other embodiments, the second washcoat layer comprises substantially only rhodium supported on refractory metal oxide particles. The refractory metal oxide of some embodiments comprises alumina doped with up to 30% zirconia.

The first washcoat layer of various embodiments may comprise at least one platinum group metals selected from the group consisting of platinum, palladium, rhodium, iridium and mixtures thereof supported on refractory oxide particles. Further embodiments may have baria in the first washcoat layer.

The substrate of one or more embodiments comprises a honeycomb substrate comprising a plurality of longitudinally extending passages formed by longitudinally extending walls bounding and defining said passages, the passages comprising inlet passages having an open inlet end and closed outlet end, and outlet passages having a closed inlet end and an open outlet end.

The nitrogen oxide storage catalyst of some embodiments has a second washcoat layer with a total loading of from 0.05 to 5 g/in$^3$ and is less than the loading of the first washcoat layer. In other embodiments, the first washcoat layer may comprise barium carbonate and ceria in a ratio of from 1:3 to 1:10.

Additional embodiments of the invention are directed to treatment systems for an automobile exhaust gas stream. The treatment system of some of these embodiments comprises a combustion engine which operates periodically between lean and rich conditions, an exhaust gas conduit in communication with the engine, and a nitrogen oxide storage catalyst as described above disposed within the exhaust gas conduit.

Further embodiments of the invention are directed to methods of making a nitrogen oxide storage catalyst. The methods include applying a bottom washcoat to a substrate, the bottom washcoat comprising ceria, baria and at least one precious metal. A top washcoat is applied over the bottom washcoat, the top washcoat comprising at least one, preferably exactly one, i.e. a single precious metal, wherein the top washcoat is substantially free of cerium and barium.

The bottom washcoat of some embodiments is prepared by mixing a first solution of a barium compound with ceria particles to provide a first mixture. At least one precious metal is impregnated into alumina. A solution of a zirconium salt is added to the precious metal impregnated alumina, thereby providing a slurry and milling the slurry. The first mixture is added to the slurry and milled again. The substrate is washcoated with the slurry. A top washcoat is prepared by making a slurry comprising a precious metal impregnated alumina. Milling the slurry and washcoat layer the substrate with the milled slurry to create a top washcoat over the bottom washcoat.

In one embodiment, the alumina in the top washcoat slurry is doped with up to 30% zirconium oxide, preferably from 5 to 30%, more preferably from 5 to 25%, more preferably from 5 to 20%, and still more preferably from 5 to 15%. The loading of the top washcoat is up to 5 g/in$^3$, preferably from 0.05 to 5 g/in$^3$, more preferably from 0.05 to 4 g/in$^3$, more preferably from 0.05 to 3 g/in$^3$, more preferably from 0.05 to 2 g/in$^3$, and still more preferably from 0.1 to 1 g/in$^3$, and is less than the loading of the bottom washcoat. The bottom washcoat of various embodiments comprises barium carbonate and ceria in a ratio of from 1:3 to 1:10.

Still further embodiments are directed to a method of treating an automobile exhaust gas stream. These methods comprise passing the exhaust gas across a nitrogen oxide storage catalyst having at least a bilayer structure, with at least a bottom layer and a top layer, wherein the bottom layer comprises ceria particles having an alkaline earth metal compound supported on the particles and the top layer comprises a single precious metal and is substantially free of cerium and barium.

BRIEF DESCRIPTION OF THE DRAWINGS

in FIG. 1, "E2" stands for "Example 2", "E3" stands for "Example 3", and "CE1" stands for "Comparative Example 1". "T" denotes the temperature in ° C., and "NOxC" stands for "NOx Conversion" (in %).

in FIG. 2, "E2" stands for "Example 2", "E3" stands for "Example 3", and "CE1" stands for "Comparative Example 1". "T" denotes the temperature in ° C., and "NOxS" stands for "NOx Storage at 85% Efficiency" (in g/L).

in FIG. 3, "E2" stands for "Example 2", and "CE1" stands for "Comparative Example 1". "T" denotes the temperature in ° C., and "NOxS" stands for "NOx Storage at 85% Efficiency" (in g/L).

in FIG. 4, "E5" stands for "Example 5", "E2" stands for "Example 2", and "CE4" stands for "Comparative Example 4". "T" denotes the bed temperature in ° C., and "NOxC" stands for "NOx Conversion" (in %).

in FIG. 5, "E5" stands for "Example 5", "E2" stands for "Example 2", and "CE4" stands for "Comparative Example 4". "T" denotes the bed temperature in ° C., and "NOxS" stands for "NOx Storage at 85% Efficiency" (in g/L).

DETAILED DESCRIPTION

Figure 1:
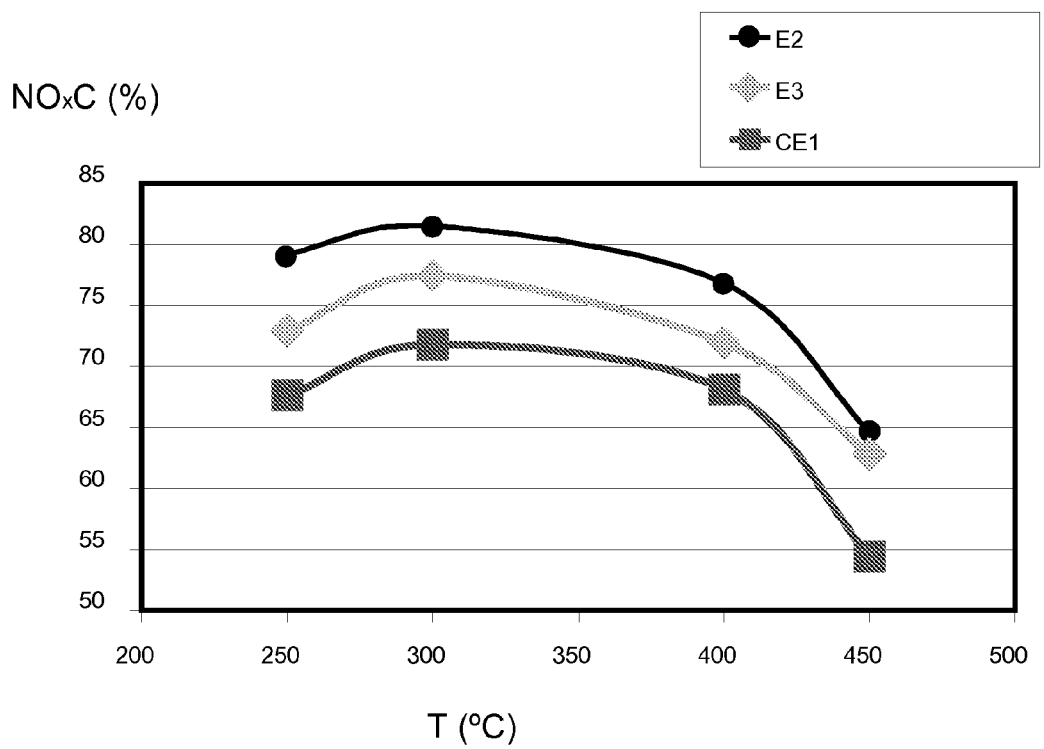
FIG. 1 is a graph comparing the percent NO$_x$ conversion as a function of temperature for various catalysts.

Before describing several exemplary embodiments of the invention, it is to be understood that the invention is not limited to the details of construction or process steps set forth in the following description. The invention is capable of other embodiments and of being practiced or being carried out in various ways.

As used in this specification and the appended claims, the singular forms "a", "an" and "the" include plural referents unless the context clearly indicates otherwise. Thus, for example, reference to "a precious metal" includes a combination of two or more precious metals, and the like.

According to one or more embodiments of the present invention, a second coating layer applied over a first coating containing NOx storage materials is provided. The second coating layer contains a single precious metal, and is free of platinum, cerium and barium to prevent detrimental interaction of rhodium or palladium precious metals with cerium, barium and platinum. In one specific embodiment of the invention, a $NO_x$ storage material comprises a metal compound selected from an alkali metal compound, an alkaline earth metal compound, and a rare earth metal compound. The metal compound may be in an oxide, hydroxide, or carbonate form. In one embodiment, the metal compound is in carbonate form or a mixture of carbonates, for example, $BaCO_3$ or mixtures of $BaCO_3$ and $MgCO_3$ supported on a suitable support particle. Suitable metal oxide support particles include, but are not limited to alumina, ceria, ceria-alumina, zirconia, zirconia-alumina, ceria-zirconia-alumina, and mixtures thereof. These metal oxide support particles may also be doped with lanthanum or other suitable rare earth materials. According to one or more embodiments of the invention, Ba sintering and Ba composite compound formation is reduced under the conditions of thermal stress in an exhaust gas of a lean burn engine. The $NO_x$ storage material according to embodiments of the present invention demonstrates improved $NO_x$ storage capacity after thermal aging when used in a catalytic trap.

According to other embodiments of the invention, methods of manufacturing $NO_x$ storage materials and catalytic traps including these storage materials are provided. Other embodiments of the invention pertain to catalysts in the form of a catalytic trap for abatement of $NO_x$ in an exhaust gas stream generated by an internal combustion engine which is operated periodically between lean and stoichiometric or rich conditions. According to one or more embodiments, the catalyst in the form of a catalytic trap has a first layer comprising a catalytic trap material including a catalytic component effective for promoting the reduction of $NO_x$ under stoichiometric or rich conditions supported on a refractory metal oxide and a $NO_x$ storage material effective for adsorbing the $NO_x$ under lean conditions and desorbing and reducing the $NO_x$ to nitrogen under stoichiometric or rich conditions, the $NO_x$ storage material comprising particles of ceria having an alkaline earth compound, for example, barium carbonate, supported on the metal oxide support particles, the catalytic trap material being disposed on a refractory carrier member. An additional layer comprising a precious metal may be disposed over the first layer. The second layer may be substantially free of cerium or barium.

As used in this specification and the appended claims, the term "substantially free of" means it contains less than 1% of the subject substance.

As used in this specification and the appended claims, the term "substantially only" means is contains greater than 99% of the subject substance.

Embodiments of the invention pertain to processes for abatement of $NO_x$ in an exhaust gas stream generated by an internal combustion engine which periodically operates alternately between lean and stoichiometric or rich conditions, comprising locating the above-described catalytic trap in an exhaust passage of the engine and treating the exhaust gas stream with a catalytic trap whereby at least some of the $NO_x$ in the exhaust gas stream is adsorbed by the catalytic trap during the periods of lean conditions and is desorbed from the catalytic trap and reduced to nitrogen during the periods of stoichiometric or rich conditions.

The metal oxide support particles of the catalytic trap may be a porous refractory metal oxide and have a high surface area such as alumina, for example, gamma-alumina. Other suitable support materials include titania, titania-alumina, zirconia, zirconia-alumina, baria-alumina, lanthana-alumina, lanthana-zirconia-alumina titania-zirconia, and mixtures thereof. Desirably, the refractory metal oxide support will have a surface area of from 5 to 350 $m^2/g$, and more particularly of from 100 to 200 $m^2/g$. A suitable support material for the precious metal is alumina, which may be doped with one or more other materials. The refractory metal oxide support, preferably the alumina, in the top washcoat slurry is preferably doped with up to 30% zirconium oxide, preferably from 5 to 30%, more preferably from 5 to 25%, more preferably from 5 to 20%, and still more preferably from 5 to 15%. In particular, alumina having a BET surface area of from 175 to 225 $m^2/g$ such as about 200 $m^2/g$ and doped with up to 30% $ZrO_2$ and, even more preferably, up to 4% LaO provided good results.

In one or more detailed embodiment of the present invention the catalytic component comprises a precious metal component, i.e., a platinum group metal component. Suitable precious metal components include platinum, palladium, rhodium and mixtures thereof. The catalytic component will typically be present in an amount of up to 200 $g/ft^3$, preferably from 50 to 200 $g/ft^3$, more preferably from 55 to 150 $g/ft^3$, and more specifically, of from 60 to 120 $g/ft^3$.

The $NO_x$ storage material employed in the catalytic trap according to embodiments of the present invention comprises a $NO_x$ storage material comprising a metal compound selected from an alkaline earth metal compound, an alkali metal compound and rare earth metal compound in oxide or carbonate form, for example, $BaCO_3$, supported on $CeO_2$ particles.

In one or more embodiments, the NOx storage material is disposed on a refractory carrier member. Examples of such substrates include, for example, stainless steel, titanium, aluminum zirconate, aluminum titanate, aluminum phosphate, cordierite, mullite and corundum. The carrier member may be employed as a monolithic honeycomb structure, spun fibers, corrugated foils, layered materials, etc.

In a gasoline vehicle application, a catalytic device employing a three-way conversion ("TWC") catalyst may be used in conjunction with the catalytic trap of the invention. Such a device will be located in an exhaust passage of the internal combustion engine and will be disposed upstream and/or downstream of the catalytic trap. The TWC catalyst would typically include platinum, palladium and rhodium catalytic components dispersed on a high surface area refractory support and may also contain one or more base metal oxide catalytic components such as oxides of iron, manganese or nickel. Such catalysts can be stabilized against thermal degradation by expedients such as impregnating an activated alumina support with one or more rare earth metal oxides, e.g., ceria. Such stabilized catalysts can sustain very high operating temperatures. For example, if a fuel cut technique is utilized, temperatures as high as 1050° C. may be sustained in the catalytic device.

If the catalytic device is employed and is located upstream of the catalytic trap of the invention, the catalytic device would be mounted close to the exhaust manifold of the engine. In such an arrangement, the TWC catalyst would warm up quickly and provide for efficient cold start emission control. Once the engine is warmed up, the TWC catalyst will remove HC, CO and $NO_x$ from the exhaust gas stream during stoichiometric or rich operation and HC and CO during lean operation. In one embodiment, the catalyst in the form of a catalytic trap would be positioned downstream of the catalytic device where the exhaust gas temperature enables maximum $NO_x$ trap efficiency. During periods of lean engine operation, when $NO_x$ passes through the TWC catalyst, $NO_x$ is stored on the catalytic trap. The catalytic trap is periodically desorbed and the $NO_x$ is reduced to nitrogen under periods of stoichiometric or rich engine operation. If desired, a catalytic device containing a TWC catalyst may be employed downstream of the catalytic trap of the invention. Such catalytic device will serve to remove further amounts of HC and CO from the exhaust gas stream and, in particular, will provide for efficient reduction of the $NO_x$ to nitrogen under periods of stoichiometric or rich engine operation.

In a diesel vehicle application, the catalytic $NO_x$-trap according to embodiments of the invention may be used in conjunction with a diesel oxidation catalyst (DOC), and a catalyzed soot filter (CSF); where the DOC and CSF are placed either before or after the catalytic device of this invention. In another embodiment of the invention, it is possible to place the $NO_x$-trap catalyst directly onto the filter media.

The several components of the catalytic trap material may be applied to the refractory carrier member, i.e., the substrate, as a mixture of two or more components or as individual components in sequential steps in a manner which will be readily apparent to those skilled in the art of catalyst manufacture. A typical method of manufacturing the catalytic trap of the present invention is to provide the catalytic trap material as a coating or layer of washcoat on the walls of the gas-flow passages of a suitable carrier member. This may be accomplished, by impregnating a fine particulate refractory metal oxide support material, e.g., gamma alumina, with one or more catalytic metal components such as a precious metal, i.e., platinum group, compound or other noble metals or base metals, drying and calcining the impregnated support particles and forming an aqueous slurry of these particles. Dried particles of the bulk $NO_x$ sorbent may be included in the slurry. Alternatively, the $NO_x$ storage material or sorbent may be dispersed into the support, preferably in an impregnation operation, as described below. Activated alumina may be thermally stabilized before the catalytic components are dispersed thereon, as is well known in the art, by impregnating it with, e.g., a solution of a soluble salt of barium, lanthanum, zirconium, rare earth metal or other suitable stabilizer precursor, and thereafter drying (e.g., at 110° C. for one hour) and calcining (e.g., at 550° C. for one hour) the impregnated activated alumina to form a stabilizing metal oxide dispersed onto the alumina. Base metal catalysts may optionally also have been impregnated into the activated alumina, for example, by impregnating a solution of a base metal nitrate into the alumina particles and calcining to provide a base metal oxide dispersed in the alumina particles.

The carrier may then be immersed into the slurry of impregnated activated alumina and excess slurry removed to provide a thin coating of the slurry on the walls of the gas-flow passages of the carrier. The coated carrier is then dried and calcined to provide an adherent coating of the catalytic component and, optionally, the catalytic trap material, to the walls of the passages thereof. The carrier may then be immersed into a slurry of fine particles of component of the $NO_x$ storage material as a second or overlayer coating deposited over the layer of catalytic component. A magnesium component, e.g., a solution of a magnesium salt such as magnesium nitrate, acetate, sulfate, hydroxide, etc., may be combined with the slurry of component of the $NO_x$ storage material or it may be applied as a third or overlayer coating deposited over the second layer of the $NO_x$ storage material. The carrier is then dried and calcined to provide a finished catalyst trap member in accordance with one embodiment of the present invention.

Alternatively, the alumina or other metal oxide support particles impregnated with the catalytic component may be mixed with bulk or supported particles of the $NO_x$ storage material in an aqueous slurry, and this mixed slurry of catalytic component particles and $NO_x$ storage material particles may be applied as a coating to the walls of the gas-flow passages of the carrier. Preferably, however, for improved dispersion of the $NO_x$ storage material, the washcoat of catalytic component material, after being dried and calcined, is immersed (post-dipped) into a solution of a component ($NO_x$ storage material precursor compound (or complex) and a magnesium precursor compound (or complex) to impregnate the washcoat with the $NO_x$ storage material precursor. The impregnated washcoat is then dried and calcined to provide the $NO_x$ storage material dispersed throughout the washcoat.

In use, the exhaust gas stream which is contacted with the catalytic trap of the present invention is alternately adjusted between lean and stoichiometric/rich operating conditions so as to provide alternating lean operating periods and stoichiometric/rich operating periods. It will be understood that the exhaust gas stream being treated may be selectively rendered lean or stoichiometric/rich either by adjusting the air-to-fuel ratio fed to the engine generating the exhaust or by periodically injecting a reductant into the gas stream upstream of the catalytic trap. For example, the composition of the present invention is well suited to treat the exhaust of engines, including diesel engines, which continuously run lean. In such case, in order to establish a stoichiometric/rich operating period, a suitable reductant, such as fuel, may be periodically sprayed into the exhaust immediately upstream of the catalytic trap of the present invention to provide at least local (at the catalytic trap) stoichiometric/rich conditions at selected intervals. Partial lean-burn engines, such as partial lean-burn gasoline engines, are designed with controls which cause them to operate lean with brief, intermittent rich or stoichiometric conditions.

Accordingly, one or more embodiments of the invention are directed to a nitrogen oxide storage catalyst comprising a substrate and at least two washcoat layers. The first washcoat layer comprises a nitrogen oxide storage material. The nitrogen oxide storage material comprises a metal compound in oxide or carbonate form, the metal selected from an alkaline earth metal, an alkali metal, and a rare earth metal supported on support particles. The second washcoat layer is applied on top of the first washcoat layer and comprises a single precious metal. The second washcoat layer may be substantially free of cerium and barium.

The second washcoat layer of other embodiments comprises rhodium or palladium and is substantially free of platinum. In other embodiments, the second washcoat layer comprises substantially only rhodium supported on refractory metal oxide particles. By separating the rhodium from platinum, palladium barium and cerium, this prevents the rhodium from forming composites with barium and alloys with other precious metals. If the precious metal in the second layer forms an alloy with platinum, the NO oxidation activity of platinum will be reduced, and the NOx reduction properties of the catalyst will be diminished. The refractory metal oxide of some embodiments comprises alumina doped with up to 30% zirconia.

The first washcoat layer of various embodiments may comprise at least one platinum group metals selected from the group consisting of platinum, palladium, rhodium, iridium and mixtures thereof supported on refractory oxide particles. Further embodiments may have baria in the first washcoat layer.

The nitrogen oxide storage catalyst of some embodiments has a second washcoat layer with a total loading of from 0.05 to 5 g/in$^3$ and is less than the loading of the first washcoat layer. In other embodiments, the first washcoat layer may comprise barium carbonate and ceria in a ratio of from 1:3 to 1:10.

Additional embodiments of the invention are directed to treatment systems for an automobile exhaust gas stream. The treatment system of some of these embodiments comprises a combustion engine which operates periodically between lean and rich conditions, an exhaust gas conduit in communication with the engine, and a nitrogen oxide storage catalyst as described herein disposed within the exhaust gas conduit.

Further embodiments of the invention are directed to methods of making a nitrogen oxide storage catalyst. The methods include applying a bottom washcoat to a substrate, the bottom washcoat comprising at least one precious metal, metal oxide support particles and an alkaline earth metal compound, an alkali metal compound and a rare earth metal compound. A top washcoat is applied over the bottom washcoat, the top washcoat comprising a single precious metal, wherein the top washcoat is substantially free of platinum, cerium and barium.

The bottom washcoat of specific embodiments is prepared by mixing a first solution of a barium compound with ceria particles to provide a first mixture. At least one precious metal is impregnated into alumina. A solution of a zirconium salt is added to the precious metal impregnated alumina, thereby providing a slurry and milling the slurry. The first mixture is added to the slurry and milled again. The substrate is washcoated with the slurry. A top washcoat is prepared by making a slurry comprising a precious metal impregnated alumina. Milling the slurry and coating the substrate with the milled slurry to create a top washcoat over the bottom washcoat.

In one embodiment, the alumina in the top washcoat slurry is doped with up to 30% zirconium oxide. The loading of the top washcoat is up to 5 g/in$^3$, and is less than the loading of the bottom washcoat.

The bottom washcoat of various embodiments comprises barium carbonate and ceria in a ratio of from 1:3 to 1:10.

Still further embodiments are directed to a method of treating an automobile exhaust gas stream. These methods comprise passing the exhaust gas across a nitrogen oxide storage catalyst having at least a bilayer structure, with at least a bottom layer and a top layer, wherein the bottom layer comprises ceria particles having an alkaline earth metal compound supported on the particles and the top layer comprises a precious metal and is substantially free of cerium and barium.

The catalyst compositions are disposed on a substrate. The substrate may be any of those materials typically used for preparing catalysts, and will usually comprise a ceramic or metal honeycomb structure. Any suitable substrate may be employed, such as a monolithic substrate of the type having fine, parallel gas flow passages extending therethrough from an inlet or an outlet face of the substrate, such that passages are open to fluid flow therethrough (referred to as honeycomb flow through substrates). The passages, which are essentially straight paths from their fluid inlet to their fluid outlet, are defined by walls on which the catalytic material is disposed as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from 60 to 400 or more gas inlet openings (i.e., cells) per square inch of cross section.

The substrate can also be a wall-flow filter substrate, where the channels are alternately blocked, allowing a gaseous stream entering the channels from one direction (inlet direction), to flow through the channel walls and exit from the channels from the other direction (outlet direction). AMOX and/or SCR catalyst composition can be coated on the flow through or wall-flow filter. If a wall flow substrate is utilized, the resulting system will be able to remove particulate matter along with gaseous pollutants. The wall-flow filter substrate can be made from materials commonly known in the art, such as cordierite, aluminum titanate or silicon carbide. It will be understood that the loading of the catalytic composition on a wall flow substrate will depend on substrate properties such as porosity and wall thickness, and typically will be lower than loading on a flow through substrate.

The ceramic substrate may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alpha-alumina, an aluminosilicate and the like.

The substrates useful for the catalysts of embodiments of the present invention may also be metallic in nature and be composed of one or more metals or metal alloys. The metallic substrates may be employed in various shapes such as corrugated sheet or monolithic form. Suitable metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium and the like. The surface or the metal substrates may be oxidized at high temperatures, e.g., 1000° C. and higher, to improve the resistance to corrosion of the alloys by forming an oxide layer on the surfaces the substrates. Such high temperature-induced oxidation may enhance the adherence of the refractory metal oxide support and catalytically promoting metal components to the substrate.

Without intending to limit the invention in any manner, embodiments of the present invention will be more fully described by the following examples.

Comparative Example 1

Preparation of First Layer $BaCO_3$ and $CeO_2$ were intimately mixed and finely dispersed in a weight ratio of from 1:3 to 1:10. Cerium oxide having a BET surface area of from 50 to 150 m$^2$/g was mixed with a solution of barium acetate such that the $BaCO_3/CeO_2$ composite had a $BaCO_3$ content of from 10 to 30 wt %. After mixing, the suspension of soluble barium acetate and $CeO_2$ was then dried at a temperature of from 90° C. to 120° C. to obtain a solid mixture of barium acetate and ceria.

After drying, the mixture was then heated at 550° C. to 800° C. for 2 hours to form particles of ceria having barium carbonate supported on the ceria particles. The resulting BaCO$_3$ had a crystallite size of from about 20 to about 30 nm and the ceria had a crystallite size of from about 6.5 to about 10 nm. The BaCO$_3$ and CeO$_2$ crystallites formed particles with a size of from about 6 to about 15 microns. The BET surface area of the particulate mixture is from 30 to 80 m$^2$/g.

Preparation of Catalytic Component

To provide a fully formulated NO$_x$ storage catalyst or catalytic trap as described above, in addition to the manufacture of barium carbonate supported on ceria, a precious metal can be supported on a refractory oxide according to the following description. Pt and Rh are impregnated onto Al$_2$O$_3$ by an incipient wetness procedure to yield 1.8 weight percent Pt and 0.1 weight percent Rh. Pd is impregnated separately onto alumina to a Pd loading of 1.4 weight percent.

The alumina had a BET surface area of 200 m$^2$/g and contained 10% zirconia. A mixture of 2.2 g/in$^3$ of the Pt/Rh alumina with 0.6 g/in$^3$ Pd on alumina was prepared. A solution of zirconium acetate with a content of 0.2 g/in$^3$ was added, giving a slurry with a solid content of 45%. This slurry was milled with a ball mill until a particle size of 12 micron (d$_{90}$) was obtained. Magnesium acetate was added to the slurry and stirred to dissolve, yielding 0.6 g/in$^3$ magnesium oxide. To this mixture, 2.9 g/in$^3$ BaCO$_3$/CeO$_2$ dried powder is added and the slurry is eventually milled at pH 5-6 until a particle size of 11 micron (d$_{90}$) is obtained.

Coating of a Substrate

Ceramic or metallic honeycomb substrates were coated with the slurry in a dip coating manner and then dried in a dryer and subsequently calcined in a furnace under air at 450° C. to 550° C. The coating procedure is then repeated until a loading of from 4 to 6.5 g/in$^3$ is achieved.

Example 2

Samples were prepared in accordance with Example 1 above, with the addition of a second layer, as described below. A slurry with a metal loading of 5 g/ft$^3$ rhodium on an alumina support was prepared and used to create a second layer having a washcoat layer loading of 0.5 g/in$^3$ rhodium, as described below in greater detail.

Preparation of a Second Layer

A precious metal is impregnated onto alumina with a BET surface area greater than 100 m$^2$/g. The alumina may be doped with zirconia up to 30%. After impregnation, the alumina slurry is diluted to 35% solids with water. The pH is adjusted to 3.5 to 4 using tartaric acid and/or monoethanolamine (MEA). The slurry is then milled to about 12 micron with a continuous mill. Subsequently, the pH is adjusted to 6.5 using MEA.

To create a second, or subsequent layer, a coated substrate is coated again with the slurry in a dip coating manner and then dried in a dryer. The substrate is then calcined in a furnace under air at 450° C. to 550° C. The coating procedure is repeated until a loading of from 0.1 to 1 g/in$^3$ is achieved.

Example 3

Samples were prepared in accordance with Example 1 above, with the addition of a second layer comprising palladium, as previously described. A slurry was prepared to obtain a metal loading of the coated substrate of 10 g/ft$^3$ palladium and a washcoat layer loading of the second layer of 0.5 g/in$^3$ alumina.

Comparative Example 4

Samples were prepared in accordance with Example 1 above. The total metal loading was 3.6 g/ft$^3$ Rh, 72 g/ft$^3$ Pt and 14.4 g/ft$^3$ Pd.

Example 5

Samples were prepared in accordance with Example 1 above, with the addition of a second layer comprising rhodium, as previously described. A slurry was prepared to obtain a metal loading of the coated substrate of 5 g/ft$^3$ rhodium and used to create a second layer having a washcoat layer loading of 0.5 g/in$^3$ alumina.

NOx Storage Capacity Testing

Catalytic traps were evaluated after aging for 8 hours at 850° C., as follows. An engine was set to an air/fuel ratio of 11.6 for 2 minutes at the desired temperature to remove all stored NO$_x$ and oxygen from the catalyst. This mode represents rich engine operation. Subsequently, the engine was adjusted to an air/fuel ratio of 29.6 under constant NO$_x$ mass flow. This mode represents lean engine operation. During the whole test, the NO$_x$ concentration was measured before and after the NO$_x$ trap using a NO$_x$ analyzer.

$$U = \frac{NO_x^{massoutlet}}{NO_x^{massinlet}} \cdot 100 \qquad (1)$$

After the 2 minute rich operation followed by a 60 second lean operation, the engine was set to a 3 second rich operation to remove stored NO$_x$ without having hydrocarbon and carbon monoxide tailpipe emissions. This 60 sec lean/3 sec rich cycle was repeated 10 times to establish constant catalyst conditions. For the time period of the 10 lean/rich cycles the NO$_x$ efficiency (U) is calculated from the NO$_x$ inlet and NO$_x$ outlet concentrations via equation (1): NO$_x$ storage mass in g is calculated via equation (2):

$$NO_x^{mass}(g) = \int NO_x \cdot \dot{V}/V_{ideal} \cdot M_S \cdot 1/(3.6 \cdot 10^6) dt \qquad (2)$$

NO$_x$=NO$_x$ concentration (ppm)
V=volume flow (m$^3$/h)
V$_{ideal}$=ideal molar volume (l/mol) at STP
Ms=Molar weight of NO$_2$ (g/mol)
dt=time interval (s)

After the 10 lean/rich cycles, the engine is operated for 1 min rich to remove the stored NO$_x$ completely. Subsequently, the engine is operated under lean condition until no more NO$_x$ is stored in the trap. Under these conditions, the overall NO$_x$ storage capacity is evaluated. However, to achieve a NO$_x$ conversion of greater than 80%, the NO$_x$ storage capacity at high NO$_x$ efficiency is decisive.

Figure 2:
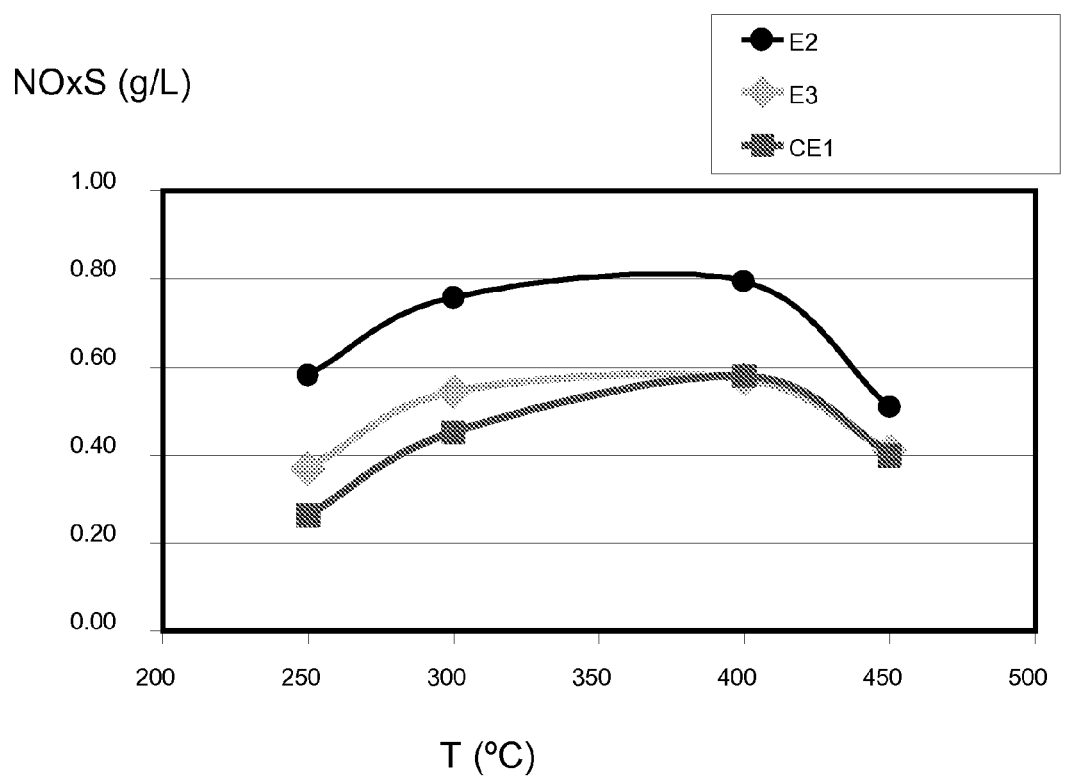
FIG. 2 is a graph comparing the NO$_x$ storage at 85% efficiency as a function of temperature for various catalysts.

FIGS. 1 and 2 demonstrate that the inventive nitrogen oxide storage catalysts (Example 2 and Example 3) have greater NO$_x$ conversion and storage than Comparative Example 1. These samples were aged in an oven for 4 hours at 800° C.

Figure 3:
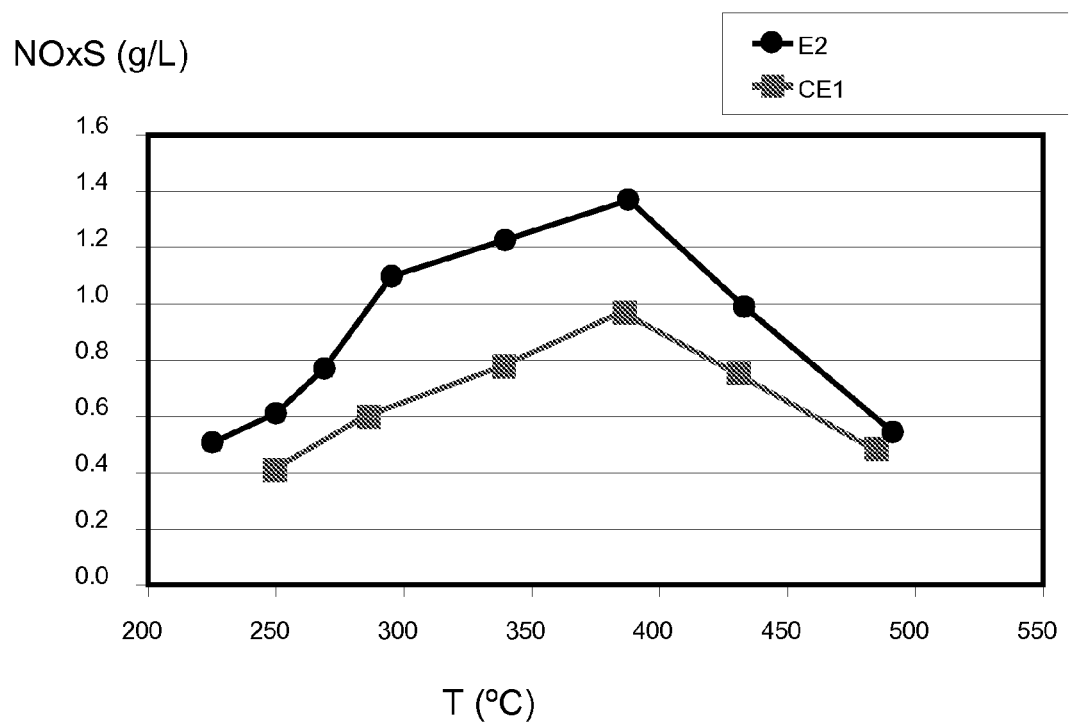
FIG. 3 is a graph comparing the NO$_x$ storage at 85% efficiency as a function of temperature for various catalysts.

FIG. 3 shows that the inventive nitrogen oxide storage catalyst has a greater NOx storage at 85% efficiency than Comparative Example 1.

Figure 4:
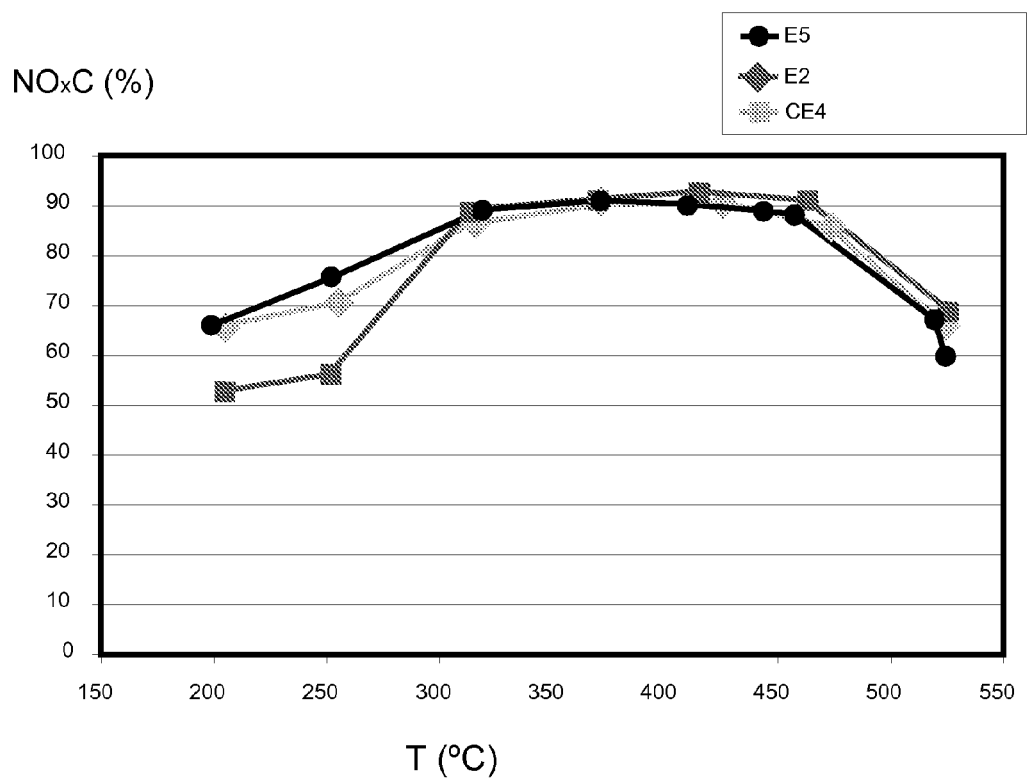
FIG. 4 is a graph comparing the percent NO$_x$ conversion as a function of temperature for various catalysts.
Figure 5:
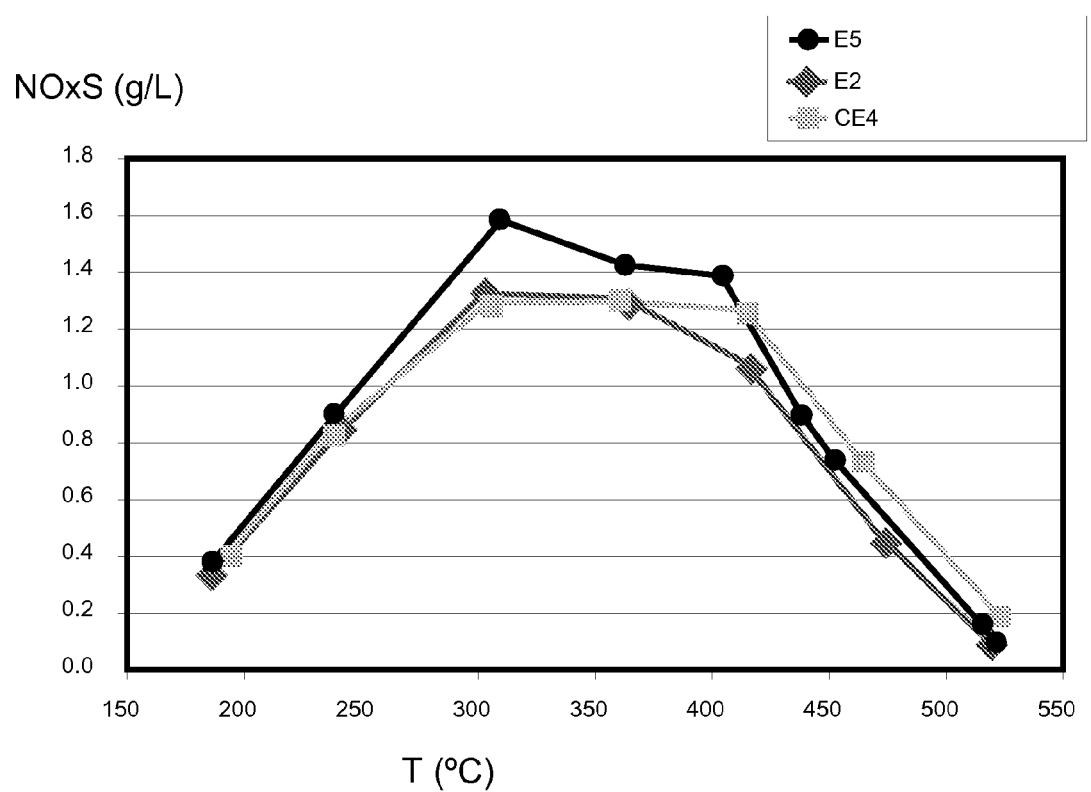
FIG. 5 is a graph comparing the NO$_x$ storage at 85% efficiency as a function of temperature for various catalysts.

FIGS. 4 and 5 show the effect of the thickness of the rhodium/alumina topcoat. The samples were aged for 25 hours at a temperature of 800° C. The λ for these measurements was 1.02. The thickness of the topcoat, 0.5 g/in$^3$ vs. 1 g/in$^3$, does not have a significant effect on the NO$_x$ conversion. However, the catalyst with the topcoat with 0.5 g/in³ resulted in better NOx storage at 85% efficiency, over the testing range.

Although the invention has been described with reference to several exemplary embodiments, it should be understood that the invention is not limited to the details of construction or process steps set forth in the examples. The invention is capable of other embodiments and of being practiced or being carried out in various ways.

The present application also refers to the following embodiments, including the specific combinations of embodiments as defined by the specific back-references indicated in the embodiments:

1. (First embodiment) A nitrogen oxide storage catalyst comprising:
a substrate;
a first washcoat layer on the substrate, the first washcoat layer comprising a nitrogen oxide storage material comprising metal oxide support particles having a metal compound selected from alkaline earth metal compound, alkali metal compound and a rare earth metal compound supported on the metal oxide support particles; and
a second washcoat layer over the first washcoat layer comprising a single precious metal, the second washcoat layer being substantially free of platinum, cerium and barium.

2. The nitrogen oxide storage catalyst of embodiment 1, wherein the single precious metal is selected from rhodium and palladium.

3. The nitrogen oxide storage catalyst of embodiment 2, wherein the second washcoat layer comprises substantially only rhodium supported on refractory metal oxide particles.

4. The nitrogen oxide storage catalyst of embodiment 3, wherein the refractory metal oxide comprises alumina doped with about 5% to about 30% zirconia.

5. The nitrogen oxide storage catalyst of embodiment 1, wherein the first washcoat layer further comprises at least one member of platinum group metals selected from the group consisting of platinum, palladium, rhodium, iridium and mixtures thereof supported on refractory oxide particles.

6. The nitrogen oxide storage catalyst of embodiment 3, wherein the first washcoat layer further comprises a barium compound.

7. The nitrogen oxide storage catalyst of embodiment 1, wherein the substrate comprises a honeycomb substrate comprising a plurality of longitudinally extending passages formed by longitudinally extending walls bounding and defining said passages, the passages comprising inlet passages having an open inlet end and closed outlet end, and outlet passages having a closed inlet end and an open outlet end.

8. The nitrogen oxide storage catalyst of embodiment 1, wherein the total loading of the second washcoat layer is between about 0.05 to about 5 g/in³ and is less than the loading of the first washcoat layer.

9. The nitrogen oxide storage catalyst of embodiment 6, wherein the first washcoat layer comprises barium carbonate and ceria in a ratio between about 1:3 to about 1:10.

10. A treatment system for an automobile exhaust gas stream, comprising:
a combustion engine which operates periodically between lean and rich conditions;
an exhaust gas conduit in communication with the engine; and
a nitrogen oxide storage catalyst in accordance with any of embodiments 1 to 9, disposed within the exhaust gas conduit.

11. The treatment system of embodiment 10, the catalytic component comprising at least one member of platinum group metals selected from the group consisting of platinum, palladium, rhodium, iridium and mixtures thereof.

12. The treatment system of embodiment 10, wherein the top layer is substantially free of platinum and palladium.

13. The system of embodiment 10, wherein the top layer is comprised of essentially only rhodium supported on alumina particles.

14. The system of embodiment 10, wherein the substrate comprises a honeycomb substrate comprising a plurality of longitudinally extending passages formed by longitudinally extending walls bounding and defining said passages, the passages comprising inlet passages having an open inlet end and closed outlet end, and outlet passages having a closed inlet end and an open outlet end.

15. A method of making a nitrogen oxide storage catalyst comprising:
applying a bottom washcoat to a substrate, the bottom washcoat comprising ceria, a barium compound and at least one precious metal;
applying a top washcoat over the bottom washcoat, the top washcoat comprising at least one precious metal, wherein the top washcoat is substantially free of cerium and barium.

16. The method of embodiment 15, wherein the top washcoat is substantially free of platinum.

17. The method of embodiment 15, wherein the precious metal in the top washcoat comprises substantially only rhodium.

18. The method of embodiment 15, wherein the bottom washcoat is prepared by mixing a first solution of barium with ceria particles to provide a first mixture, impregnating alumina with at least one precious metal, adding a solution of a zirconium salt to the precious metal impregnated alumina to providing a slurry, milling the slurry, adding first mixture to the slurry to provide a mixed slurry, milling the mixed slurry, and coating the substrate with the mixed slurry; and the top washcoat is prepared by making a top washcoat slurry comprising a precious metal impregnated alumina, milling the slurry, and coating the substrate with the milled top washcoat slurry over the bottom washcoat 19. The method of embodiment 15, wherein the alumina in the top washcoat slurry is doped with about 5% to about 30% zirconium oxide.

20. The method of embodiment 15, wherein the top washcoat has a loading of about 0.05 to about 5 g/in³ and is less than the loading of the bottom washcoat.

21. The method of embodiment 15, wherein the bottom washcoat comprises barium carbonate and ceria in a ratio of about 1:3 to about 1:10.

22. A method of treating an automobile exhaust gas stream comprising passing exhaust gas across a nitrogen oxide storage catalyst having at least a bilayer structure, with at least a bottom layer and a top layer, wherein the bottom layer comprises metal oxide support particles having a metal compound selected from alkali earth metal compounds, alkaline earth metal compounds and rare earth metal compounds supported on the metal oxide support particles and the top layer comprises a single precious metal selected from rhodium and palladium and is substantially free of cerium and barium.

23. The method of embodiment 22, wherein the top layer is substantially free of platinum.

24. The method of embodiment 22, wherein the precious metal component of the top layer is substantially only rhodium.

25. The method of embodiment 22, where in the top layer has a loading of about 0.05 to about 5 g/in³ and is less than the loading of the bottom layer.

The invention claimed is:

1. A nitrogen oxide storage catalyst, comprising:
   (A) a substrate;
   (B) a first washcoat layer on the substrate, the first washcoat layer comprising a nitrogen oxide storage material comprising ceria support particles comprising barium carbonate supported on the ceria support particles; and
   (C) a second washcoat layer over the first washcoat layer, the second washcoat layer comprising rhodium in an amount about 5 g/ft³ supported on refractory metal oxide particles comprising alumina doped with up to 30% zirconia, wherein the second washcoat layer is substantially free of platinum, cerium, and barium, and compounds thereof.

2. The nitrogen oxide storage catalyst of claim 1, wherein the refractory metal oxide particles comprise alumina doped with from 5% to 30% zirconia.

3. The nitrogen oxide storage catalyst of claim 2, wherein the first washcoat layer further comprises:
   at least one member selected from the group consisting of platinum, palladium, rhodium, and iridium, supported on refractory oxide particles.

4. The nitrogen oxide storage catalyst of claim 2, wherein the substrate comprises a honeycomb substrate comprising a plurality of longitudinally extending passages formed by longitudinally extending walls bounding and defining said passages, and
   the passages comprise
      inlet passages having an open inlet end and closed outlet end, and
      outlet passages having a closed inlet end and an open outlet end.

5. The nitrogen oxide storage catalyst of claim 2, wherein a total loading of the second washcoat layer is from 0.05 to 5 g/in³ (0.05 to 5 g/(2.54 cm)³) and is less than a loading of the first washcoat layer.

6. The nitrogen oxide storage catalyst of claim 1, wherein the first washcoat layer further comprises:
   at least one member selected from the group consisting of platinum, palladium, rhodium, and iridium, supported on refractory oxide particles.

7. The nitrogen oxide storage catalyst of claim 6, wherein the substrate comprises a honeycomb substrate comprising a plurality of longitudinally extending passages formed by longitudinally extending walls bounding and defining said passages, and
   the passages comprise
      inlet passages having an open inlet end and closed outlet end, and
      outlet passages having a closed inlet end and an open outlet end.

8. The nitrogen oxide storage catalyst of claim 6, wherein a total loading of the second washcoat layer is from 0.05 to 5 g/in³ (0.05 to 5 g/(2.54 cm)³) and is less than a loading of the first washcoat layer.

9. The nitrogen oxide storage catalyst of claim 1, wherein the substrate comprises a honeycomb substrate comprising a plurality of longitudinally extending passages formed by longitudinally extending walls bounding and defining said passages, and
   the passages comprise inlet passages having an open inlet end and closed outlet end, and outlet passages having a closed inlet end and an open outlet end.

10. The nitrogen oxide storage catalyst of claim 9, wherein a total loading of the second washcoat layer is from 0.05 to 5 g/in³ (0.05 to 5 g/(2.54 cm)³) and is less than a loading of the first washcoat layer.

11. The nitrogen oxide storage catalyst of claim 1, wherein a total loading of the second washcoat layer is from 0.05 to 5 g/in³ (0.05 to 5 g/(2.54 cm)³) and is less than a loading of the first washcoat layer.

12. The nitrogen oxide storage catalyst of claim 1, wherein the first washcoat layer comprises ceria and barium carbonate in a barium carbonate:ceria ratio from 1:3 to 1:10.

13. A treatment system for an automobile exhaust gas stream, comprising:
   a combustion engine which operates periodically between lean and rich conditions;
   an exhaust gas conduit in communication with the combustion engine; and
   the nitrogen oxide storage catalyst in accordance with claim 1 disposed within the exhaust gas conduit.

14. A method of making a nitrogen oxide storage catalyst as claimed in claim 1, the method comprising:
   (a) applying a first washcoat to the substrate, the first washcoat comprising the nitrogen oxide storage material comprising ceria support particles having barium carbonate supported on the ceria support particles;
   (b) applying a second washcoat over the first washcoat, the second washcoat comprising rhodium in an amount about 5 g/ft³ supported on refractory metal oxide particles comprising alumina doped with up to 30% zirconia, wherein the second washcoat is substantially free of platinum, cerium, and barium.

15. The method of claim 14, wherein the alumina in the second washcoat slurry is doped with from 5% to 30% zirconia.

16. The method of claim 14, wherein the second washcoat has a loading of from 0.05 to 5 g/in³ (0.05 to 5 g/(2.54 cm)³) and is less than the loading of the first washcoat.

17. The method of claim 14, wherein the first washcoat comprises ceria and barium carbonate in a barium carbonate:ceria ratio of from 1:3 to 1:10.

18. A method of treating an automobile exhaust gas stream, the method comprising:
   passing exhaust gas across a nitrogen oxide storage catalyst as claimed in claim 1 having at least a bilayer structure, with at least a first layer and a second layer.

19. A nitrogen oxide storage catalyst, comprising:
   (A) a substrate;
   (B) a first washcoat layer on the substrate, the first washcoat layer comprising a nitrogen oxide storage material comprising ceria support particles comprising barium carbonate supported on the ceria support particles; and
   (C) a second washcoat layer over the first washcoat layer, the second washcoat layer comprising rhodium in an amount from 2 to 8 g/ft³ supported on refractory metal oxide particles comprising alumina doped with up to 30% zirconia, wherein the second washcoat layer is substantially free of platinum, cerium, and barium, and compounds thereof.

* * * * *